US009848578B2

(12) United States Patent  (10) Patent No.: US 9,848,578 B2
Miller  (45) Date of Patent: Dec. 26, 2017

(54) TOY AND APP FOR REMOTELY VIEWING AND PLAYING WITH A PET

(71) Applicant: Lee Miller, New York, NY (US)

(72) Inventor: Lee Miller, New York, NY (US)

( * ) Notice: Subject to any disclaimer, the term of this patent is extended or adjusted under 35 U.S.C. 154(b) by 353 days.

(21) Appl. No.: 14/215,498

(22) Filed: Mar. 17, 2014

(65) Prior Publication Data

US 2014/0267720 A1    Sep. 18, 2014

Related U.S. Application Data

(60) Provisional application No. 61/787,786, filed on Mar. 15, 2013.

(51) Int. Cl.
*A01K 5/02*    (2006.01)
*A01K 15/02*   (2006.01)

(52) U.S. Cl.
CPC ................... *A01K 15/025* (2013.01)

(58) Field of Classification Search
CPC ..................................... A01K 15/025
USPC .......................................... 348/143
See application file for complete search history.

(56) References Cited

U.S. PATENT DOCUMENTS

| 3,592,355 | A | * | 7/1971 | Manzer | G07F 13/10 221/104 |
| 4,823,738 | A | * | 4/1989 | Gold | A01K 5/0114 119/51.01 |
| 5,443,036 | A | | 8/1995 | Amiss et al. | |
| 6,400,903 | B1 | * | 6/2002 | Conoval | H04N 5/23203 348/E5.043 |
| 6,505,576 | B2 | | 1/2003 | Nathanson et al. | |
| 6,557,495 | B2 | | 5/2003 | Lorenz | |
| 6,651,591 | B1 | | 11/2003 | Chelen | |
| 6,701,872 | B1 | | 3/2004 | Allen | |
| 7,066,780 | B2 | | 6/2006 | Jamison | |
| D560,835 | S | | 1/2008 | Hass | |
| 8,347,823 | B1 | | 1/2013 | Thomas et al. | |

(Continued)

FOREIGN PATENT DOCUMENTS

WO    2010045612 A1    4/2010
WO    2011058341 A1    5/2011

OTHER PUBLICATIONS

PCT International Patentability Report and Written Opinion; PCT/US2014/030239; dated Sep. 24, 2015 (7 pgs).

(Continued)

*Primary Examiner* — Jamie Atala
*Assistant Examiner* — James Boylan
(74) *Attorney, Agent, or Firm* — Gearhart Law LLC (57) ABSTRACT

An app and associated toy are disclosed that allow a smartphone user to play remotely with a pet by controlling the movement of a remote spot of light. A remote camera allows the user to see and record video of the pet playing. The light spot is controlled by moving a cursor, or by directly moving the light spot on a touch video screen. The viewer also has the option to have the spot follow a predetermined path. By starting the play at the same time as presenting a noise designed to attract a pet, the pet is conditioned to associate that noise with playing. This allows the pet to be summoned to the game. In a more advanced version, the app also controls a treat dispenser for rewarding the pet for playing. An RFID tag on the pet allows the light source to be shone near to the pet.

5 Claims, 5 Drawing Sheets

(56) References Cited

U.S. PATENT DOCUMENTS

| | | | |
|---|---|---|---|
| 2001/0037773 A1 | 11/2001 | Nathanson et al. | |
| 2002/0002955 A1 | 1/2002 | Lorenz | |
| 2006/0011144 A1 | 1/2006 | Kates | |
| 2006/0115265 A1* | 6/2006 | Elberbaum | F16M 11/18 396/427 |
| 2007/0246622 A1* | 10/2007 | Fistor | B60R 11/00 248/205.5 |
| 2008/0011243 A1 | 1/2008 | Moulton | |
| 2008/0288298 A1 | 11/2008 | Bloksberg | |
| 2009/0090305 A1 | 4/2009 | Cheok et al. | |
| 2010/0024740 A1 | 2/2010 | Grepper | |
| 2011/0018994 A1 | 1/2011 | Russoniello et al. | |
| 2011/0308470 A1* | 12/2011 | Vermeegen | A01K 5/0114 119/51.5 |
| 2012/0298049 A1 | 11/2012 | Cook et al. | |
| 2013/0068173 A1* | 3/2013 | Jamison | A01K 15/021 119/707 |
| 2013/0300863 A1* | 11/2013 | Tait | A01K 15/02 348/143 |
| 2013/0319337 A1* | 12/2013 | Davis | A01K 5/0114 119/57.1 |
| 2014/0203499 A1* | 7/2014 | Lo | B65H 1/00 271/145 |

OTHER PUBLICATIONS

PCT International Search Report and Written Opinion; PCT/US2014/030239; dated Dec. 11, 2014 (9 pgs).

* cited by examiner

TOY AND APP FOR REMOTELY VIEWING AND PLAYING WITH A PET

CLAIM OF PRIORITY

This application claims the priority of U.S. Ser. No. 61/787,786 filed on Mar. 15, 2013, the contents of which are fully incorporated herein by reference.

FIELD OF THE INVENTION

The invention relates to toy for the amusement or exercise of an animal, and more particularly to a laser toy for remotely viewing and playing with a pet and a smartphone app to facilitate interaction.

BACKGROUND OF THE INVENTION

Pets, especially indoor cats, require frequent play for both their physical and emotional well-being. A working owner of such an indoor pet may be restricted in the time available for playing in-person and may, therefore, want to play with their pet while at work or otherwise distant from the animal.

Laser pointers are a well-known way of engaging with pets, many of whom play tirelessly chasing the red dot that forms when a laser beam makes contact with a surface.

By combining a remotely movable laser pointer with a remote camera, a pet owner may play with their pet remotely while seeing and hearing their pet. The use of automated sequences of play may also allow the owner to watch their pet playing while they are otherwise occupied.

REVIEW OF RELATED TECHNOLOGY

U.S. Pat. No. 7,066,780 issued to Jamison on Jun. 27, 2006 entitled "Pet entertainment device" describes a pet entertainment device for the entertainment of a pet. The device has a laser device that is configured to attach to a pet though use of a garment, such as a collar. The laser device is preferably controllable through use of a remote control so that the movement of the pet (dog, cat, etc.) can be directed by the pet's owner.

U.S. Pat. No. 6,651,591 issued to Chelen on Nov. 25, 2003 entitled "Automatic laser pet toy and exerciser" describes a pet toy and exerciser which produces an automatically movable, outwardly projected laser beam. The function thereof is to provide virtual "prey" for the stimulation and exercise of an animal. The device, which does not include a conventional motor, is small (e.g., can be hand-held), lightweight, battery operated and silent, and has an extremely long potential cycle life. Electrically energized nitinol wires deflect a visible laser module to produce a virtual laser light target moved through three dimensions.

US Patent Application 2012/0298049 issued to A. Cook et al. on Nov. 29, 2012 entitled "Light Projecting Pet Toy" describes a laser pet toy including a light source with a focused beam of light of a predetermined shape and programmable random travel across an opaque surface such as a floor or wall to create an engaging image for a pet to play with the image for entertainment or exercise.

U.S. Pat. No. 8,347,823 issued to Thomas et al. on Jan. 8, 2013 entitled "Pet triggered programmable toy" that describes a pet toy having a control module, active triggering module, and passive triggering module. The device is an interface between a pet and pet toy or other useful device. A pet can trigger at will a moving highly collimated light dot for exercise, entertainment, mental stimulation, education, and even surrogate companionship in the absence of a human caretaker. Pets that fail to learn triggering behavior will benefit from pre-set play periods as programmed or selected by their caretaker and/or passive activation such as infrared detection or another proximity sensing switch.

Various implementations are known in the art, but fail to address all of the problems solved by the invention described herein. Embodiments of this invention are illustrated in the accompanying drawings and will be described in more detail herein below.

SUMMARY OF THE INVENTION

An inventive toy and web and/or mobile application ("app") for remotely viewing and playing with a pet is disclosed.

The toy may include both a remotely controlled light pointer and a remote camera so that a user may, in real time, maneuver a spot of light on a remote surface while watching their pet chase the moving spot of light. An app may allow a smartphone to be used to facilitate the interaction.

In a preferred embodiment, a digital processor may be functionally connected to a viewing screen on which a controlled cursor may be displayed. A user may be able to move the cursor in both a horizontal and vertical direction, and in so doing, may control the direction in which a remotely controlled light beam is pointing. At the same time, the viewing screen may display images from a camera located along with the controlled light source to observe the motion of the light beam and the activities of a pet that may be chasing the spot caused by the light source when it intersects with a surface.

In a preferred embodiment, the light source may be a laser or a focused light emitting diode (LED) that may be mounted on an electronically movable platform. The viewing screen and user may be in one location, while the camera and the movable light source may be in a second location, remote from the first.

Signals may be sent to and from the digital processer, the camera, and the electronically movable platform carrying the light source by connections such as, but not limited to, a direct physical link, a wireless link mediated by transceivers connected to each location, a link over a public digital network, or some combination thereof.

The controlled cursor may be displayed on the viewing screen in a control cursor window and may be moved by user interactions such as, but not limited to, motion on a touch screen, using a mouse, using buttons on a real or virtual computer keyboard, a real or virtual five way controller or some combination thereof.

The processor may also contain one or more predefined predetermined patterns of motion of the cursor and, therefore, of the spot caused by the laser beam. These predetermined patterns may be recorded from actual play and may be made to run in a continuous loop mode.

In a further preferred embodiment of the invention, the camera may also be mounted on an electronically controlled platform and may be moved in pan, zoom, and tilt by the remote operator using a device such as, but not limited to, a real or virtual five way controller, a mouse controlled cursor, a touch controlled cursor, one or more keys of a real or virtual computer keyboard or some combination thereof.

The images supplied by the camera to the viewing screen may be a sequence of still images, or a video steam, including, but not limited to compressed high definition video.

In a further preferred embodiment of the invention, the viewing screen may be part of a smartphone. Similarly, the camera may be part of a second smartphone.

In addition to a camera, the remote site may include a microphone that may relay sounds in both directions. Therefore, the present invention succeeds in conferring the following, and others not mentioned, desirable and useful benefits and objectives.

It is an object of the present invention to provide a toy for playing remotely with a pet.

It is another object of the present invention to provide a way to see and hear the pet playing remotely.

Yet another object of the present invention is to provide an interactive way of playing with the pet.

Still another object of the present invention is to provide an inexpensive yet effective toy for remote playing and watching a pet.

Still another object of the present invention is to a way to automate some or all of the effort in playing remotely with a pet.

DESCRIPTION OF THE PREFERRED EMBODIMENTS

The preferred embodiments of the present invention will now be described with reference to the drawings. Identical elements in the various figures are identified with the same reference numerals.

Various embodiments of the present invention are described in detail. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
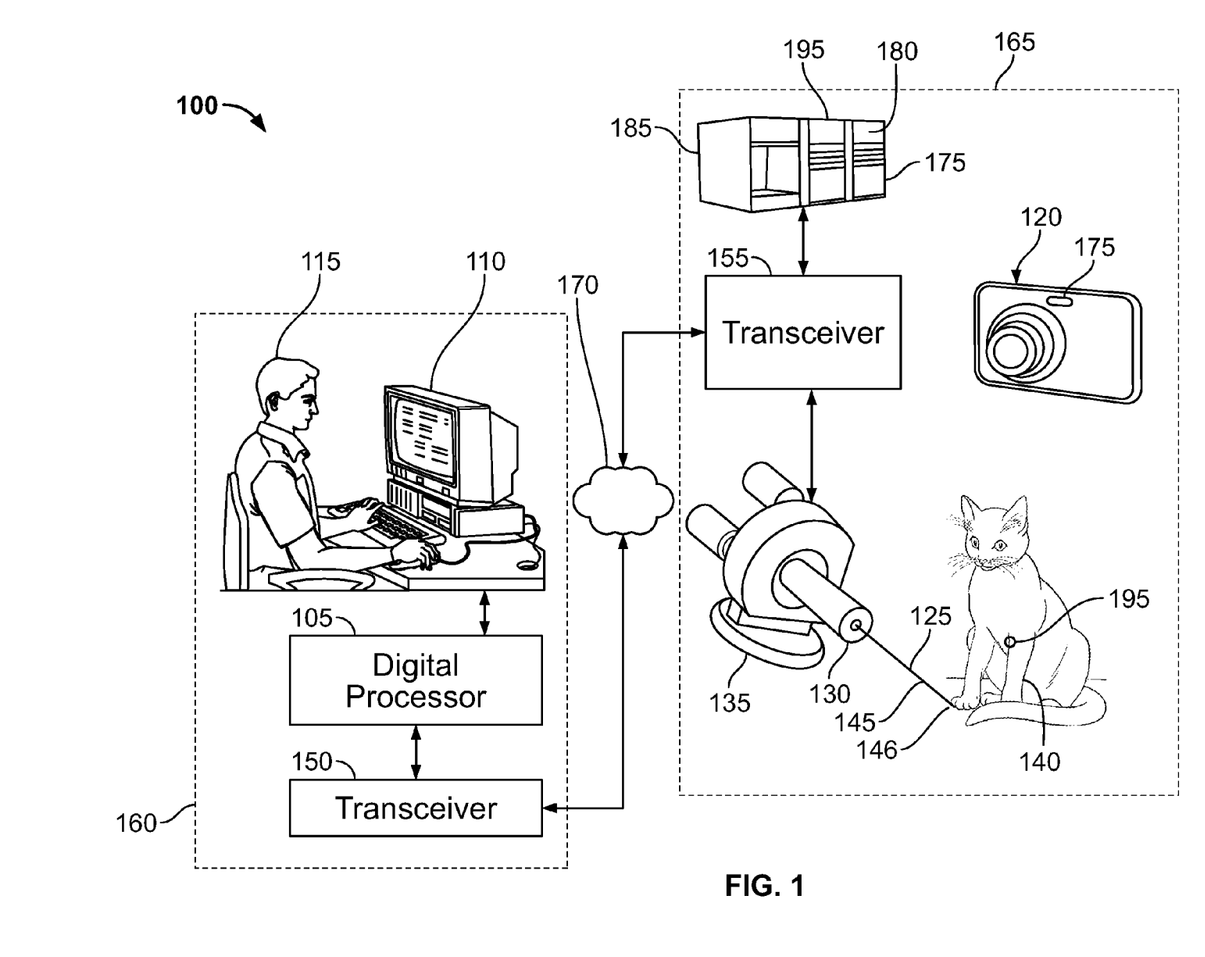
FIG. 1 shows a schematic overview of a preferred embodiment of an app and it's functionality for remotely viewing and playing with a pet using a toy of the present invention.

FIG. 1 shows a schematic overview of a preferred embodiment of an computer implemented program or app and it's functionality for remotely viewing and playing with a pet using a toy of the present invention.

A user 115 may be located in a first location 160, along with a viewing screen 110 that may be attached to a digital processor 105.

The user may be in communication with a camera 120 and a light source 130 that may be located in a second location 165 that may be remote from the first location 160.

An app operable on the digital processor 105 may allow the user 115 to play with a pet 140 that may also be located in the second location 165. The app may, for instance, allow the user to remotely control a light source 130 that may be pointed in a particular direction 145. At the point where the beam of light 125 emitted by the light source 130 intersects a solid surface, a spot 146 will appear. By altering the direction of the beam of light 125, the user may cause the spot to move around and may, therefore, entice a pet 140 to play or exercise. The user may observe the pet at play via images from the camera 120 that may be relayed by the app to the viewing screen 110 located proximate to the user 115.

The light source 130 may be any suitably collimated light source. In a preferred embodiment, the light source 130 may be a diode or solid state laser, or a suitably focused light emitting diode (LED).

In a preferred embodiment, the digital processor 105 and the viewing screen 110 may both be part of the same smartphone on which the app is operable. A first transceiver 150 that may be part of the same smartphone may wirelessly connect the smartphone to the light source 130 and the camera 120 via a public digital network 170 and a second transceiver 155.

In further embodiments, the transceivers may instead use a short range protocol such as, but not limited to, a Wi-Fi wireless communications protocol.

The light source 130 may, for instance, be mounted on a electronically movable platform 135. In a preferred embodiment, the electronically movable platform 135 may use DC motors to alter the direction in which the beam of light 125 is pointed. The electronically movable platform 135, the light source 130 and the camera 120 may each or all be powered by batteries, rechargeable batteries, a power source connected to the mains or some combination thereof.

In a further preferred embodiment of the invention, there may be a sound emitting device 180 located proximate to the light source. The sound emitting device may, for instance, be used to emit a sound that attracts the pets. Cats, for instance, are easily attracted to high frequency noises that may sound like scratching or high pitched squeaking. By producing such a sound for a brief period when the light source is first turned on, the pet may be conditioned, or trained, to associate the noise with playing with the light beam and may thereby be called to play.

In a preferred embodiment the camera 120 may be both a still and a video camera, and may incorporate a microphone 175 so that the sounds of the pet playing may also be heard by the user. The app may also facilitate recording of the still and video images. The recording may, for instance, occur either at the camera 120 or at the digital processor 105. In order to save memory, the video recording may be suitably compressed using standards such as, but not limited to, MPEG compression that is well-known in the art. The recorded video may also or instead be captured at either the device attached to the camera 120, or by the device attached to the viewing screen 110. Either of these devices may, for instance, be a smartphone and may be equipped to upload the video directly to the Internet, either for viewing as a streaming video or for being stored on, for instance, a cloud based memory device.

In a further preferred embodiment of the invention, there may also be a treat dispensing mechanism 185 located at the second location 165. The treat dispensing mechanism 185 may, for instance, be similar to a well-known PEZ® dispenser. It may be loaded with pet treats that the user 115 may elect to dispense using a control signal.

Figure 2:
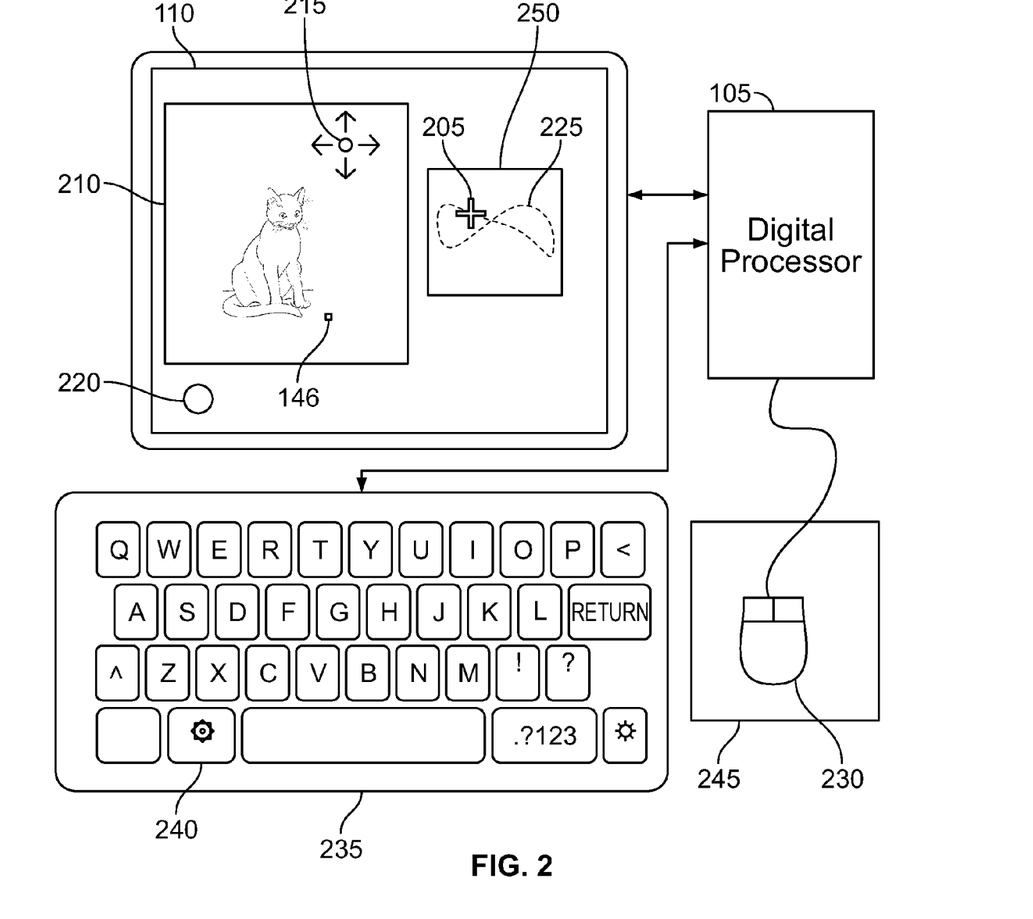
FIG. 2 shows a schematic overview of an app enabled control portion of a system for remotely viewing and playing with a pet of the present invention.

FIG. 2 shows a schematic overview of an app enabled control portion of an system for remotely viewing and playing with a pet of the present invention.

As shown in FIG. 2, an app operable on a digital processor 105 may mediate user interactions in order to control the light source and the camera in the remote location.

In a preferred embodiment, a user may be able to see a viewing screen 110 that may be controlled by the app of this invention running on a digital processor 105. The viewing screen 110 may, for instance, display a video images 210 taken in the remote location and showing the pet playing with the spot 146.

In one embodiment of the invention the user may access a computer mouse 230 on a mouse-pad 245. Movement of the mouse on the mouse-pad may, for instance, be relayed via the digital processor 105 to control the position of a controlled cursor 205 that may be displayed in a control cursor window 250. The position of the cursor, or the control signals associated with positioning the cursor, may also be relayed to the electronically movable platform 135 on which the light source 130 is mounted so that the motion of the light source and hence the motion of the spot 146 is effectively controlled by the position of the cursor (see FIG. 1).

In a further preferred embodiment of the invention, the computer mouse 230 may directly control the position of the spot in the image 210 and hence effectively control the motion of the light source and the actual spot.

Either of these interactions may instead be accomplished using a touch screen. If viewing screen 110 includes an overlaid touch sensitive screen, then a user may move the cursor 205 horizontally or vertically within the control cursor window 250 in order to control the motion of the light source and hence the motion of the spot 146.

In a touch screen implementation, a user may interact directly with video and may effectively move the spot using their finger.

In a further preferred embodiment of the invention, the user may interact with the digital processor 105 using a keyboard or keypad. The computer keyboard 235 may be a physical or a virtual keyboard containing physical or virtual keyboard buttons 240. By selecting a particular keyboard buttons 240, the user may initiate a predetermined pattern of movement of the spot such as, but not limited to, the predetermined pattern of motion 225 shown. The predetermined pattern may also be combined with the RFID detector and RFID tag so as not to point the laser at or close to the pet. Knowing where the RFID tag may be located, and hence where the pet's head may be located or near, may allow the laser, or light beam, to automatically interact with the pet by always pointing a specified distance away from the pet. The user may also record patterns of play for future use.

The user may also control the motion of the camera if the camera is also mounted on a moveable mount. The user may, for instance, interact with a position control device 215 such as, but not limited to, a five way device, that may control the pan, zoom and tilt of the camera.

The user may also use a combination microphone and speaker 220 to hear noises at the remote location and also to provide sound at the remote location.

Figure 3:
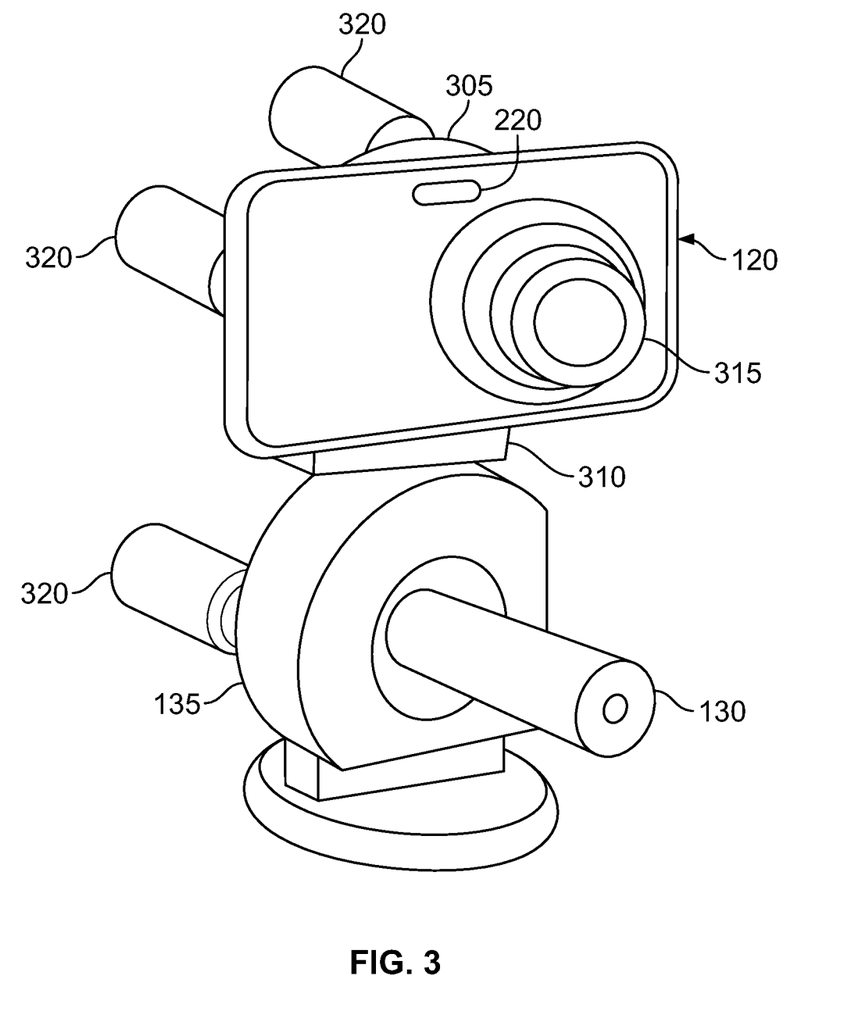
FIG. 3 shows a schematic overview of an app controlled camera and light source of a further preferred embodiment of the present invention.

FIG. 3 shows a schematic overview of an app controlled camera and light source of a further preferred embodiment of the present invention.

In addition to the light source 130 being mounted on an electronically movable platform 135, the camera 120 may also be mounted on a second electronically movable platform 305. Alternatively, the camera 120 and the light source 130 may be positioned on the same platform. The platforms may have a connection 310 between the first and second electronically movable platforms or they may be mounted separately. Both platforms may be controllable by one or more servo motors 320 or other similar devices. The camera 120 may also include a remotely controlled camera lens 315 and a speaker/microphone 220.

Figure 4:
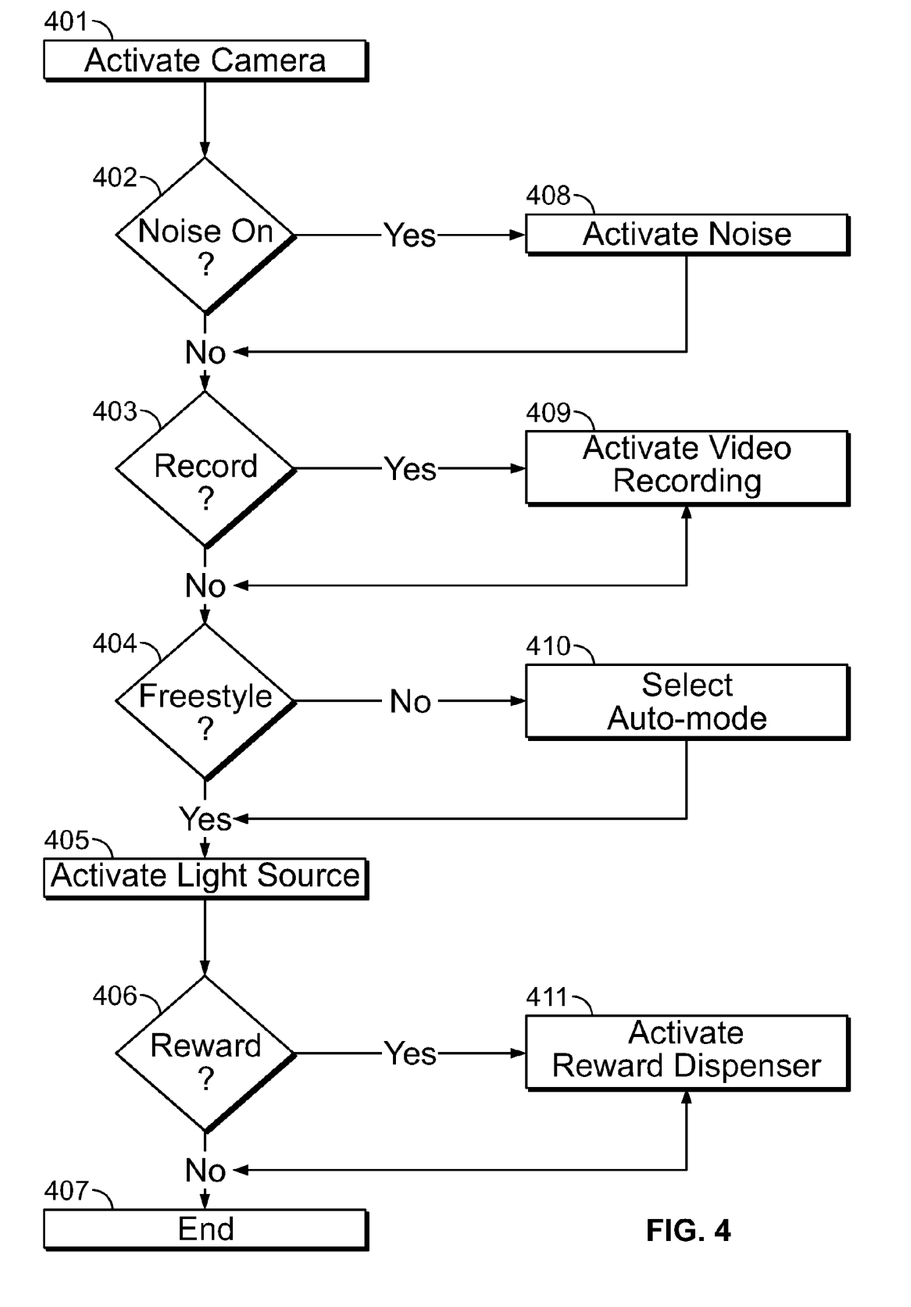
FIG. 4 shows a schematic flow diagram of an app of the present invention.

FIG. 4 shows a schematic flow diagram of an app of the present invention.

In Step 401, the user may activate the remote camera. This may, for instance, be accomplished using keypad buttons or by selecting icons on a touch screen. Activating the remote camera may include functions such as, but not limited to, accessing the remote camera wirelessly either over a telephone network, a data network, a local Wi-Fi network or some combination thereof.

In Step 402 the user may be queried as to whether they want to have the noise on. The noise may, for instance, be a noise designed to attract the pet to the light source. For instance, cats may be attracted to high pitched scratching type noises. By selecting to go to Step 408 and activate such a noise, or sound, for a short time when the light source is first turned on, the pet may be conditioned to associate the sound with the play and may therefore come to the light source from where ever they happen to be. The noise may, for instance, be activated for a time between 1 and 20 seconds.

In Step 403 the user may be queried as to whether they want to record the video. If the user elects to go to Step 409 and activate the video recording, the recorded video may be stored either at the camera or the processor, or some combination thereof. When the processor is part of a smartphone, the video may instead be relayed to a third party and stored there.

In Step 404 the user may be queried as to whether they want to have the light source controlled freestyle, i.e., if they want to control the motion of the light source and hence of the spot. If they elect not to, they may, at Step 410, be invited to select an automatic mode. This may be a standard premade program of movement or it may be a program of movement recorded from a previous freestyle mode of interacting. The selection may be made by, for instance, selecting an option such as, but not limited to, an icon, a drop down menu, a particular hard or soft keypad or keyboard button, or some combination thereof.

In Step 405, the light source may be activated, and remote playing with the pet may commence.

At a point during playing, the app may query the user as to whether they would like to reward the pet. If the user elects to activate the reward dispenser, one of whatever treats have been pre-stored in the dispenser may be dispensed. The treats may be useful in reinforcing the pets play or exercise behavior.

When the user desired to stop interacting with the device remotely, the user may go to Step 407 and end the remote playing session.

One of ordinary skill in the art will appreciate that the inventive method described above may be operating system agnostic, i.e., it may be implemented using any reasonable operating system or computing environment including, but not limited to, the Android, iOS system, and Windows system, or the like.

One of ordinary skill in the art will further appreciate that the camera, light source and other hardware described above are readily available commercially in a variety of devices. Any reasonable device containing the functionality described above may be incorporated to implement the inventive methods described above including, but not limited to, camera equipped mobile phones, smartphones, iPads, tablets, lap top computers, desktop computers, or some combination thereof.

Figure 5:
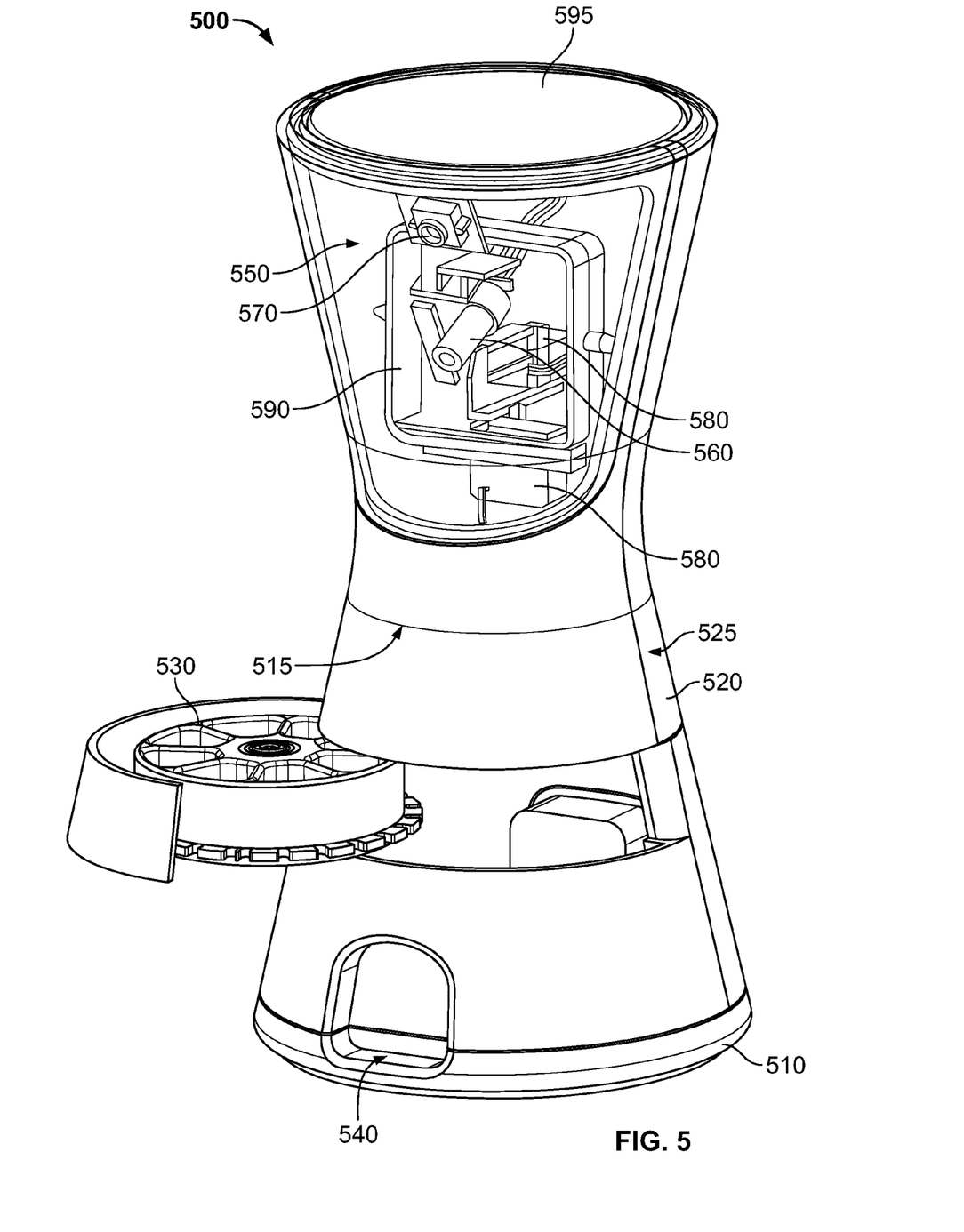
FIG. 5 shows an apparatus that interacts with the app and enables remotely viewing and interacting with a pet.

In FIG. 5, there is a representation of an embodiment of the present invention that may be used with the application as described above. The apparatus 500 can be used to interact with and monitor living things, preferably pets, from a remote location. The apparatus 500 generally has a housing 520. The housing 520 may have a first half 515 and a second half 525, as well as a base 510 and a top 595. The base 510 may be comprised of a non-slip surface or may have parts that operate as a non-slip surface. In some embodiments, the base 510 may have a flip down member that can be used to assist in securing the position of the apparatus 500. In one part of the housing 500, there is a window 550. The window 550 is preferably a transparent and/or translucent plastic and has shatter resistant properties. Additionally, the material of the window 550 should be selected to have minimal interference with optical devices such as cameras or lights.

In the windowed section of the housing 520, there is a mounting mechanism 590. There is at least one servo motor 580 operably connected to the mounting mechanism which enables rotational movement of the mounting mechanism 590. The mounting mechanism 590 may have motion through at least one, and preferably, two or three axes of motion. There may need to be a servo motor 580 included for each independent axis of motion. The mounting mechanism 590 holds and secures a light source 560 and an optical device 570. The light source 560 may be a diode or solid state laser or a suitably focused light emitting diode, but is preferably a laser. The light source 560 is positioned in a way that the movement of the mounting mechanism 590, in turn moves the direction of the emitted light. The optical device 570 is preferably a camera. The camera may have recording capabilities and could capture sounds emitted within a proximity of the apparatus 500. The optical device 570 is positioned so that the lens or other image capture mechanism is always directed in the direction of and towards the light emitted from the light source 560.

As previously described, a user can interact with the apparatus 500 from a remote location. This enables the user to interact with a pet when said user is out of the house for days at a time or only for a short time. The user manipulates the direction of the optical device 570 and the light source 560 via an electronic device such as a smartphone. The smartphone enables the user to manipulate the direction of the optical device 570 and light source 560 in real time. If the user so desires, the may be able to send an electrical signal to the apparatus 500 that activates a dispensing mechanism 530. The dispensing mechanism 530 is designed to dispense a number of items including toys, food, treats, and the like. Once selected, the dispensing mechanism 530 activates and the desired item is moved from it storage position to the dispensing outlet 540 located in the housing 520. The dispensing mechanism 530 may hinge, as shown, to enable the various toys, food, etc. to be positioned and stored within the apparatus 500 for dispensing. Further interaction may comprise such actions as described above and other not disclosed actions that are within the spirit of this invention.

The apparatus 500 may comprise varying materials including but not limited to plastics, metals, glass, resins, composites, and the like. Preferably the housing 520 is of sufficient light weight that it will not cause injury and is cost effective. Preferably plastics are used which may include polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof. Composites, when used, may include but are not limited to fiber reinforced plastics, metal composites, carbon fiber, and Kevlar® and the like. Metals may comprise lightweight metals such as aluminum and other pure metals as well as various alloys. Such aforementioned materials may comprise any of the other parts of the invention including the window 550, dispensing mechanism 530, mounting mechanism 590, and the other various components. The apparatus 500 may be wired and plug into any standard outlet or may operate off battery power. In some instances, photovoltaic cells may be used to power the apparatus 500.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An animal monitoring and treat dispensing apparatus comprising:
    a housing having a top, bottom, and an integrated window;
    a mounting mechanism positioned in a proximity to and behind the integrated window, wherein the mounting mechanism is coupled to an optical device and a light source;
    at least one servo motor operably connected to the mounting mechanism, wherein the at least one servo motor controls movement of the mounting mechanism through a x-axis and a y-axis, wherein the at least one servo motor is configured to be manually controlled via an electronic device or configured to follow a pre-programmed pattern, and wherein movement of the mounting mechanism causes movement of the optical device and the light source;
    wherein the movement of the optical device and the light source are linked by the mounting mechanism such that a lens of the optical device is directed in a direction of light emitted from the light source;
    a dispensing mechanism hingeably coupled to the housing, the dispensing mechanism comprising a rotatable tray having a plurality of slots, wherein the dispensing mechanism is actuated by a wireless signal sent to the monitoring and dispensing apparatus, wherein the dispensing mechanism is accessed via a hinge thereby allowing the plurality of slots of the dispensing mechanism to be refilled, and wherein the dispensing mechanism is disposed below the optical device and the light source; and
    a dispensing outlet coupled to the dispensing mechanism, the dispensing outlet providing a channel for transport of an item from the dispensing mechanism to the dispensing outlet.

2. The apparatus of claim 1 wherein the light source is a laser and the optical device is a camera.

3. The apparatus of claim 1 wherein the bottom comprises a non-slip surface.

4. The apparatus of claim 1 further comprising a flip down member coupled to the bottom, the flip down member being configured to secure a position of the apparatus.

5. The apparatus of claim 1 wherein the optical device is configured to record video and capture sound.

* * * * *